(12) United States Patent
Collins, Jr. et al.

(10) Patent No.: US 7,041,947 B2
(45) Date of Patent: May 9, 2006

(54) CONTROLLED FLOW INSTRUMENT FOR MICROWAVE ASSISTED CHEMISTRY WITH HIGH VISCOSITY LIQUIDS AND HETEROGENEOUS MIXTURES

(75) Inventors: Michael John Collins, Jr., Charlotte, NC (US); Wyatt Price Hargett, Jr., Matthews, NC (US); Edward Earl King, Charlotte, NC (US); Joseph Joshua Lambert, Charlotte, NC (US); James Edward Thomas, Harrisburg, NC (US)

(73) Assignee: CEM Corporation, Matthews, NC (US)

( * ) Notice: Subject to any disclaimer, the term of this patent is extended or adjusted under 35 U.S.C. 154(b) by 0 days.

(21) Appl. No.: 10/709,060

(22) Filed: Apr. 9, 2004

(65) Prior Publication Data

US 2005/0045626 A1    Mar. 3, 2005

Related U.S. Application Data

(63) Continuation-in-part of application No. 10/605,021, filed on Sep. 2, 2003.

(51) Int. Cl.
*H05B 6/74*    (2006.01)

(52) U.S. Cl. .................... 219/679; 219/687

(58) Field of Classification Search ............. 219/679, 219/687, 704, 711, 696, 726, 710, 745, 746, 219/690, 750, 751, 748–749; 422/21, 129, 422/186, 90, 186.29; 34/393; 436/55
See application file for complete search history.

(56) References Cited

U.S. PATENT DOCUMENTS

| | | |
|---|---|---|
| 4,613,738 A | 9/1986 | Saville |
| 4,736,083 A | 4/1988 | Saville |
| 5,215,715 A | 6/1993 | Haswell et al. |
| 5,319,172 A | 6/1994 | Komatsu |
| 5,387,397 A | 2/1995 | Strauss et al. |
| 5,403,564 A | 4/1995 | Katschnig et al. |
| 5,420,039 A | 5/1995 | Renoe et al. |
| 5,672,316 A | 9/1997 | Knapp |
| 5,796,080 A | 8/1998 | Jennings et al. |

(Continued)

FOREIGN PATENT DOCUMENTS

DE    195 18 540 A1    11/1996

(Continued)

OTHER PUBLICATIONS

Stephen J. Haswell et al.; On-Line Microwave Digestion of Slurry Samples With Direct Flame Atomic Absorption Spectrometric Elemental Detection; Analyst, Feb. 1992; vol. 117; pp. 117-120.

(Continued)

*Primary Examiner*—Quang Van
(74) *Attorney, Agent, or Firm*—Summa & Allan, P.A.

(57) ABSTRACT

A controlled-flow microwave instrument for chemical synthesis that includes heterogeneous or highly viscous materials. Includes a fluid reservoir for supplying or receiving fluids, a fluid pump in fluid communication with the reservoir for pumping fluids to or from the reservoir, a microwave transparent reaction vessel in fluid communication with the pump for supplying or receiving fluids to or from the pump and the reservoir, a pressure sensor in fluid communication with the reservoir and the vessel for measuring the pressure of fluids in the instrument at the sensor, and a processor in signal communication with the pressure sensor and the pump for controlling the pump and the flow of fluids in the instrument based at least in part on the pressure measured at the sensor.

7 Claims, 8 Drawing Sheets

U.S. PATENT DOCUMENTS

| | | |
|---|---|---|
| 5,932,075 A | 8/1999 | Strauss et al. |
| 5,972,711 A | 10/1999 | Barclay et al. |
| 6,086,830 A | 7/2000 | Kartchner |
| 6,288,379 B1 | 9/2001 | Greene et al. |
| 6,455,317 B1 * | 9/2002 | Lautenschlager ............ 436/55 |
| 6,508,918 B1 | 1/2003 | Campagna et al. |
| 6,521,876 B1 | 2/2003 | Jennings et al. |
| 6,607,920 B1 | 8/2003 | Jennings et al. |
| 6,744,024 B1 | 6/2004 | Hayes et al. |
| 6,867,400 B1 * | 3/2005 | Collins et al. .............. 219/687 |
| 2001/0006146 A1 | 7/2001 | Campagna |
| 2002/0117498 A1 | 8/2002 | Jennings |
| 2003/0089706 A1 | 5/2003 | Jennings |
| 2003/0170149 A1 | 9/2003 | Jennings |
| 2003/0199099 A1 | 10/2003 | King et al. |
| 2004/0020923 A1 | 2/2004 | Collins et al. |

FOREIGN PATENT DOCUMENTS

| | | |
|---|---|---|
| DE | 197 00 499 A1 | 6/1998 |
| EP | 0335020 | 4/1989 |
| EP | 0455513 | 6/1991 |
| EP | 1547681 A3 | 9/2005 |
| WO | WO 93/05345 A | 3/1993 |

OTHER PUBLICATIONS

Vassili Karanassios et al.; Rapid Stopped-flow Microwave Digestion System; Journal of Analytical Atomic Spectrometry, Sep. 1991; vol. 6: pp. 457-463.

* cited by examiner

CONTROLLED FLOW INSTRUMENT FOR MICROWAVE ASSISTED CHEMISTRY WITH HIGH VISCOSITY LIQUIDS AND HETEROGENEOUS MIXTURES

CROSS REFERENCE TO RELATED APPLICATIONS

This is a continuation in part of copending patent application Ser. No. 10/605,021 filed Sep. 2, 2003 ("the parent application") and claims priority therefrom.

BACKGROUND OF INVENTION

The present invention relates to microwave-assisted chemical processes and in particular relates to microwave-assisted chemical synthesis, carried out in automated, controlled-flow fashion, using heterogeneous and high-viscosity compositions and while providing for high pressure reactions.

The use of microwaves to provide energy to initiate, drive or control chemical reactions is well-established. Although conceptually microwaves can be used to affect a wide variety of chemical reactions, the commercial use of microwave assisted chemistry initially grew most rapidly in techniques such as loss-on-drying (gravimetric) moisture analysis and digestion reactions that provided the foundation for content analysis. Indeed, such reactions still represent a major part of the instrument market for microwave assisted chemistry. In particular, gravimetric analysis and digestion can often be carried out in rather robust fashion, for which the longer wavelengths and broad control parameters of microwaves are well-suited.

More recently, interest has greatly increased in using microwaves to drive more sensitive reactions, particularly organic synthesis, and to do so on the smaller scale—and thus more highly controlled basis—that is preferred (or necessary) in many research oriented applications. Both the speed and nature of microwaves offer certain advantages. Because microwaves react immediately with polar and semi-polar materials, they help avoid the lag time inherent in other forms of energy transfer such as conduction or convection heating. Thus, they offer a time advantage for many research schemes including those broadly referred to as "combinatorial chemistry." Just as importantly, however, electromagnetic radiation in the microwave frequencies can affect individual molecules (and thus compositions) somewhat differently—and thus potentially more favorably—than convention or conduction heating. Some of these advantages are explained in more detail in Hayes, Microwave Synthesis-Chemistry at the Speed of Light, 2002 CEM Publishing (ISBN 0-9722229-0-1).

As an additional factor, single mode cavity microwave instruments have become commercially available that are well-suited for controlled application of microwave radiation to small samples. These include the VOYAGER™, DISCOVER™ and EXPLORER™ instruments available from CEM Corporation, Matthews, N.C., for which more formal descriptions are set forth in (but not limited to) U.S. Published patent applications Nos. 20030089706 and 20020117498, U.S. Pat. Nos. 6,607,920 and 6,521,876, and pending unpublished patent applications Ser. No. 10/249,011 filed Mar. 10, 2003; Ser. No. 10/064,623 filed Jul. 31, 2002; Ser. No. 10/126,838 filed Apr. 19, 2002 and Ser. No. 10/064,261 filed Jun. 26, 2002. The contents of all of these are incorporated entirely herein by reference.

Several of these devices are batch-type devices; i.e. microwaves are applied to a fixed sample in a closed reaction vessel (or a set of fixed samples in several respective separate vessels). When an additional reaction is to be carried out, a new set of starting materials are placed in a new reaction cell which is placed in turn in the microwave cavity. Although the use of individual vessels can be automated, for the most part the reactions must be carried out in batch fashion.

For some commercial applications, however, a constant or continuous reaction scheme—i.e. exposing a continuous stream of reactants to the microwaves and producing a continuous stream of product, without intermittent manipulation of a series of vessels—is attractive or necessary option. The present generation of instrument suitable for this type of reaction is exemplified by CEM's VOYAGER™ instrument (e.g. Ser. No. 10/064,623). This type of instrument is broadly exemplified by an appropriate source of liquid starting materials, suitable fluid pumps (with those for high pressure liquid chromatography, "HPLC" being exemplary), and a flow path that carries the reactants through a microwave field for a time sufficient for a desired reaction to take place. The time spent in the microwave field is, however, dictated by the diameter and length of the flow path taken together with the flow rate of the reactants. Because practical considerations tend to limit the length of the flow path that can be conveniently placed in a commercial instrument, the time spent in the microwave field is also limited.

Although the latest generation of both the batch and continuous systems offer significant advantages for chemical synthesis, each includes characteristics that preclude it from handling certain types of reactions. The batch systems can handle high pressure and heterogeneous starting materials, but cannot offer continuous operation from a reactant source. The flow-through systems can use reactants and generate products on a continuous basis, but generally cannot handle (because of pumping or flow considerations) heterogeneous starting materials or high viscosity fluids, or do so at high pressures. For example, conventional HPLC pumps cannot handle higher viscosity liquids or any solids whatsoever. Even if pumps that can handle solids are incorporated, however, the available flow rates raise specific problems in microwave assisted chemistry. Higher flow rates help move solids through the instrument but reduce the available time spent in the microwave field. Lower flow rates will (mathematically at least) increase residence time in the microwave field, but tend to encourage heterogeneous mixtures (typically liquid reactants and solvents in combination with solid-phase catalysts or solid-supported reagents) to separate into their respective phases before reacting properly or, in severe cases, blocking the flow path and rendering the instrument temporarily or permanently unusable.

Flow-through devices also lack a stirring capability, which can be particularly important for heterogeneous mixtures. Furthermore, precise temperature control (as opposed to consistent application of microwave radiation) is different or impossible in flow-through systems. Additionally, many prior flow-through systems require multimode cavities or otherwise operate in multimode fashion. Finally, conventional flow-through systems can often handle homogeneous liquids at high pressure or heterogeneous mixtures at low pressures, but cannot provide a continuous flow reaction system for carrying out high pressure reactions on heterogeneous materials. Because higher pressures (e.g. up to 250 psi or more) are advantageous to or necessary for certain reaction schemes, the ability to carry them out on an automated or flow through basis presents a function disadvantage.

Prior descriptions of proposed (or actual) flow-though or continuous devices tend to reflect—even if by silence—these limitations.

For example, U.S. Pat. No. 5,387,397 to Strauss discloses a flow-through microwave instrument that can nominally provide "a continuous and pressurized feed of liquid or slurry to and through a microwave heating zone" (column 2, lines 46–47). Of the approximately 27 actual examples included in the "397 patent, however, only two refer explicitly to the use of a heterogeneous mixture. In particular, the preparation of 4—(1—cyclohex—1—enyl)morpholine at column 11, line 62 uses a finely ground starting material in a solvent, and the preparation of phenyl vinyl ketone at column 12 line 16 describes a suspension of 5 grams of starting material in 400 milliliters of water. Other examples may create heterogeneous mixtures, but if so, Strauss does not appear to focus upon them.

Stated differently, the heterogeneous mixtures described by Strauss are in the neighborhood of about one percent by weight of the otherwise liquid volume being pumped. Furthermore, although Strauss refers to pressure control, it is in the nature of a continuous flow system and does not provide for extended residence times.

Katschnig U.S. Pat. No. 5,403,564 describes a microwave system for thermal decontamination of "pumpable or pourable" material, but essentially operates at between about one and two atmospheres.

Knapp U.S. Pat. No. 5,672,316 describes a flow-through system in which higher pressure is equilibrated by placing a flow path within a pressure-containing vessel while leaving one end of the flow path open to the interior of the vessel and a reservoir of liquid in the vessel to thereby cause the pressure on the inside and the outside of the flow path to be identical.

Haswell U.S. Pat. No. 5,215,715, which is commonly assigned with the present invention, describes a flow-through system in which samples to be digested are moved through a microwave cavity as discreet slugs at pressures of between about 30 and 120 pounds per square inch (PSI). The Haswell instrument is primarily for digestion rather than chemical synthesis as indicated by the nature of the flow-through system and the manner in which the slug and solvent are pumped through it.

Renoe U.S. Pat. No. 5,420,039, which is also commonly assigned with the present invention, describes a flow-through system in which water is pumped through at high pressure, but an ordinary sample is carried by the water rather than being pressurized. In particular, pressure is controlled in the 039 patent for the purpose of keeping gasses dissolved in a liquid sample so that the liquid sample can be consistently evaluated using a capacitance detection system.

As noted in the parent application, one of the purposes of the flow-through instrument is to provide the capability to use reactants that can include highly-viscous liquids, solids, suspensions, colloids and other liquid-solid mixtures. The viscous, heterogeneous and multi-phase characteristics of such mixtures, however, raise some additional problems.

First, even small variations in the composition of liquid-solid mixtures can create difficulties in handling and pumping such mixtures in small lines (e.g. 0.60 inch in preferred embodiments of the instrument in the parent application) and the associated valves and pumps. As a result, the flow path through the instrument can be susceptible to clogging.KVWin_undoendKVWin_undoend If the instrument is being attended by a technician, such clogging can be addressed relatively easily. One of the advantages of contemporary instruments, however, and one of their intended functions, is the capability to run in an automated fashion. Thus, although clogging can be addressed by a technician, preferred equipment should minimize or eliminate the necessity for the technician's presence. Accordingly, the need remains for an enhanced capability for such unattended automation. A need particularly exists for addressing the problem of clogging when solid-liquid mixtures are used in instruments such as that described in the parent application.

As another problem, the effect of microwave radiation all on such solid-liquid mixtures, whether suspensions or otherwise, is best carried out when the mixture is maintained in as consistent a form as possible. In order to carry this out, the usual technique is to stir or otherwise agitate the mixture during the application of microwaves and during the desired reactions.

One convenient method of stirring is the use of a magnetic stirrer, the basic form of which is familiar to most chemists. A magnetic stirrer operates by placing a small magnet, typically covered with a protective polymer such as PTFE (e.g. Teflon), inside the reaction vessel. An external rotating magnet, typically motor driven with a variable speed switch, is then placed adjacent the reaction vessel so that the motor-driven rotation of the external magnet drives the rotation of the stirrer bar inside the vessel.

This arrangement has been used with some success in microwave instruments, including the instrument described in the parent application and other instruments designed and manufactured by the assignee of the present invention. As those familiar with the operation of magnets are aware, however, the strength of a magnetic field is inversely proportional to the square of the distance from the magnet. Thus, in the case of a magnetic stirrer, as the distance between the stirrer bar in the vessel and the driving magnet increases, the strength of the coupling between the two decreases geometrically.

In particular, it has been found that it is difficult to drive a stirrer bar in a suspension in a reaction vessel in a microwave cavity of certain instruments, including those instruments described in the parent application. In turn, if the stirring cannot be carried out vigorously enough, the effect of the microwaves on the mixture will be inconsistent and reaction yields will suffer accordingly.

Therefore, a need exists for improving techniques for agitating mixtures to an appropriate consistency while they are being exposed to microwave radiation in instruments such as those described in the parent application.

SUMMARY OF INVENTION

The invention is a controlled-flow microwave instrument for chemical synthesis that includes heterogeneous or highly viscous materials. The instrument includes a fluid reservoir for supplying or receiving fluids, a fluid pump in fluid communication with the reservoir for pumping fluids to or from the reservoir, a microwave transparent reaction vessel in fluid communication with the pump for supplying or receiving fluids to or from the pump and the reservoir, a pressure sensor in fluid communication with the supply and the vessel for measuring the pressure of fluids in the instrument at the sensor, and a processor in signal communication with the pressure sensor and the pump for controlling the pump and the flow of fluids in the instrument based at least in part on the pressure measured at the sensor.

In another aspect the invention is an instrument that includes a microwave cavity, a microwave transparent vessel inside the cavity for holding reactants for exposure to microwave radiation, a magnetic stirrer bar inside the vessel for agitating reactants in the vessel during exposure to microwave radiation, a first rotating magnet positioned external to and adjacent the cavity to minimize any interaction between the magnetic field of the magnet and microwave propagation in the cavity, and a second rotating magnet inside the cavity for being driven by the first rotating magnet and for driving the rotation of the stirrer bar in the reaction vessel.

In yet another aspect, the invention is a method of conducting flow through microwave assisted chemistry. In this aspect the invention includes the steps of directing a flow of fluid between a reservoir and a reaction vessel, exposing a portion of the flowing fluid to microwave radiation to thereby initiate or accelerate chemical reactions in the fluid, measuring the pressure of the flowing fluid between the reservoir and the reaction vessel, and conditionally reversing the flow of fluid based upon the measured fluid pressure.

The foregoing and other objects and advantages of the invention and the manner in which the same are accomplished will become clearer based on the followed detailed description taken in conjunction with the accompanying drawings.

DETAILED DESCRIPTION

Figure 1:
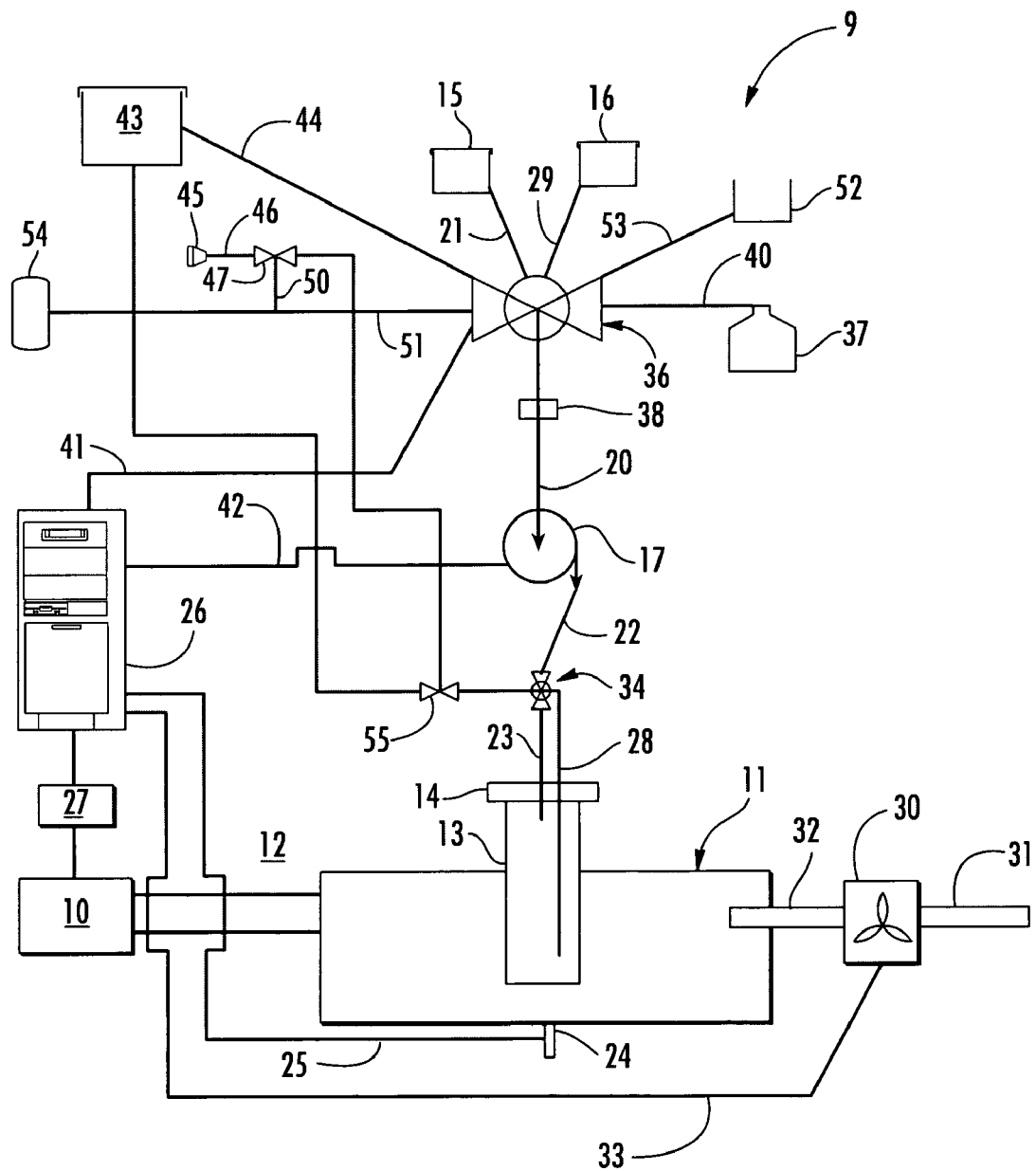
FIG. 1 is a schematic diagram of an instrument according to the claimed invention.

FIG. 1 is a schematic diagram of a controlled-flow microwave instrument for chemical synthesis using heterogeneous or highly viscous starting materials. The instrument comprises a microwave source designated at 10 for generating electromagnetic radiation in the microwave frequencies. A microwave cavity 11 is in wave communication with the source 10 for exposing compositions placed therein to microwave radiation. As illustrated in FIG. 1, the cavity 11 and the source 10 communicate through a waveguide 12. In preferred embodiments, the microwave cavity 10 is a single or dual mode cavity. Single and dual mode cavities are preferred because the value of the microwave field is predetermined at particular positions in the cavity on a consistent and reproducible basis.

A microwave transparent pressure resistant reaction vessel 13 is positioned (partially or entirely) within the cavity 11. Although it is sufficient for a portion of the vessel 13 to be transparent to microwave radiation, in preferred embodiments, the entire reaction vessel is transparent with the possible exception of an appropriate pressure fitting or cap illustrated at 14 in FIG. 1. The most preferred materials for the reaction vessel 13 are typically quartz, glass, or engineering plastics. In the preferred embodiments, the pressure resistant reaction vessel 13 has sufficient strength to maintain reactions therein at pressures of at least about 175 lbs. per square inch (psi). In the most preferred embodiments, the pressure-resistant reaction vessel 13 has strength sufficient to maintain pressures of at least about 250 lbs. per square inch, as well as all incremental pressures between 175 and 250 psi. There is, of course, no upper limit to the pressures that can be used in the vessel or the instrument other than the limits of the functional items such as the pressure vessel, the valves, and the pump. The indicated pressure range of 175–250 psi is, however, a range that is particularly useful for carrying out a wide variety of organic synthesis reactions, and thus is exemplary of the capabilities of the invention.

FIG. 1 illustrates two source reservoirs 15 and 16 for starting materials and related compositions such as catalysts, solvents and solid-supported reagents. For some starting materials and reactions, only one source reservoir is required, but more can be accommodated by including additional valves and piping as may be desired or necessary to carry out particular reactions or reaction schemes. The reservoirs 15 and 16 communicate with other portions of the instrument through the respective fluid lines 21 and 29. The term "reservoir" is used in a broad sense herein and does not necessarily refer to a particular type of container or vessel. Instead, the term can apply to any source of starting material, solvent, catalyst or any other composition that may used in the reaction and pumped through the instrument in the manner described herein.

A pump 17, preferably a peristaltic pump, is in communication with the source reservoir 15 for pumping heterogeneous or highly viscous materials from the source 15 to the reaction vessel 13 through various fluid lines, two of which are designated at 22 and 28. Peristaltic pumps are generally well-understood in this (and other arts) and are commercially available from a wide variety of sources and will not be otherwise described in detail herein.

Although a peristaltic pump is preferred, other types of pumps can be used if desired or necessary with typical examples being diaphragm pumps or pneumatic pumps. These are likewise well understood in the art and will not be described in detail herein. Any pump is appropriate provided that it carries out its pumping function in accordance with the remainder of the operation of the instrument.

FIG. 1 also illustrates that the instrument comprises a temperature detector illustrated at 24 associated with the cavity 11 for measuring the temperature of the vessel 13 or its contents. In such embodiments, the instrument also comprises means for adjusting the microwave power applied from the source 10 to the cavity 11. In FIG. 1, the adjusting means is illustrated at 27 and can comprise (for example) a switching power supplying as set forth and commonly assigned U.S. Pat. No. 6,288,379, or an optical lens system as set forth and commonly assigned U.S. Pat. No. 5,796,080. The switching power supply moderates the applied microwaves by moderating the power supplied to the source 10. The lens system moderates the microwaves after they are generated and as they are propagated into the waveguide 12 and then into the cavity 11.

FIG. 1 illustrates that the instrument most preferably includes a processor illustrated at 26 in operative communication with the temperature detector 24 and the adjusting means 27 for adjusting the microwaves applied from the source 10 to the cavity 11 in response to the temperature measured by the detector 24. In preferred embodiments, the temperature detector 24 is an infrared optical detector which measures the wavelength of infrared radiation produced by the vessel 13 or its contents and converts this into an electrical signal which is carried by signal line 25 to the processor 26. In this manner, the temperature detector can be used to help moderate, control, or maintain a constant temperature within the cavity 11 or for the vessel 13 or its contents as may be desired or necessary for some or all portions of a chemical reaction scheme.

The instrument also preferably comprises means shown as the fan 30 for cooling the vessel (and thus its contents) in the cavity at any time, but particularly during the application of microwaves. As schematically illustrated in FIG. 1, the fan 30 includes an air intake 31 and an output 32 for directing a flow of cooling air into the cavity 11. Other cooling fluids can also be used, including an inert gas maintained at a desired low-temperature. The use of temperature control in an organic synthesis reactions in connection with microwave assisted chemistry is set forth in commonly assigned pending U.S. patent application Ser. No. 10/064,261, now U.S. Pat. No. 6,744,024, the contents of which are incorporated entirely herein by reference. As set forth therein, by controlling the temperature of a reaction while concurrently adding microwave radiation, the microwave radiation can drive or control the reaction in a desired manner, while keeping the vessel's contents below a temperature that would allow the reaction to proceed in an undesired manner or potentially decompose sensitive reactants or products.

In other circumstances, the reaction of interest may not need to be cooled during the application of microwaves, but the cooling function can be carried out after the reaction is complete for the purpose of cooling the vessel and its contents and reducing the internal pressure prior to opening the vessel in the manner described later herein. Stated differently, the instrument has the capability of cooling the cavity, the vessel and the vessel's contents at any time, but the ability to do so during the application of microwave radiation is particularly useful in carrying out certain reactions.

As illustrated in FIG. 1, the fan 30 is in operative communication through the signal line 33 with the processor 26 to thereby operate the fan 30 in response to the temperature measured by the temperature detector.

In preferred embodiments, the microwave source 10 is selected from the group consisting of magnetrons, klystrons, and solid-state devices. Magnatrons are often commercially preferred because of their well-understood operation, wide availability, moderate size, and appropriate cost. These tend to be commercial factors, however, and are not limiting of the scope of the invention.

As noted in the background, the characteristic problem with respect to microwave-assisted chemistry of heterogeneous mixtures is that such can typically be pumped at low pressures. Alternatively, heterogeneous reactions can be carried out at high pressures, but cannot be pumped at high pressures. Accordingly, in order to address these complimentary problems, the instrument includes a pressure resistant valve designated at 34 in FIG. 1. The pressure-resistant valve 34 is positioned between the peristaltic pump 17 and the reaction vessel 13 for isolating the reaction vessel 13 from the pump 17 and from the source 15 during application of microwave energy to compositions in the vessel 13 and for isolating the reaction vessel from the lower pressure portions of the instrument when high pressures are generated in the reaction vessel 13 as a result of the chemical reactions being carried out therein. In preferred embodiments, the pressure resistant valve comprises a ball valve that is pressure resistant to at least about 175 psi and preferably to at least about 250 psi, and to all pressure increments therebetween. In most circumstances, the pressure resistance of the valve 34 should at least match, and preferably exceed, that of the reaction vessel 13.

The valve 34 communicates with the vessel 13 through at least one fluid line illustrated at 28 in FIG. 1. As shown therein, the fluid line 28 preferably extends to a point near the bottom of the vessel 13 to thus permit materials to be delivered to, and more importantly pumped from, the bottom portions of the vessel 13. A gas line (23 in FIG. 1) is positioned in upper portions of the vessel 13 in order to best deliver an inert gas to the vessel to help push materials from the vessel after chemical reactions therein are completed.

The various fluid lines used in the instrument can be selected as may be desired or necessary for various purposes. Typically, the lines are formed of materials that are chemically inert to the materials being transferred therethrough and mechanically strong enough to withstand the desired or necessary pressures. Thus, glass, metal and polymers are all satisfactory candidate materials, with various fluorinated hydrocarbon polymers (e.g., polytetrafluoroethylene and related polymers) being particularly suitable. The lines 23, 28 between the ball valve 34 and the vessel 13 should, of course, be strong enough to withstand the expected high pressures generated by reactions in the vessel 13 and necessarily maintained between the vessel 13 and the ball valve 34.

In the more preferred embodiments, the peristaltic pump 17 is a two-way pump for adding materials to and pumping materials from the reaction vessel 13. In such embodiment, the instrument further comprises a multi-port valve broadly designated at 36 and positioned between the source reservoirs 15, 16 and the peristaltic pump 17 for controlling the flow of materials to and from the reaction vessel 13. Fluid line 20 connects the multi-port valve 36 to the pump 17. The multi-port (multi-function, multi-position) valve 36 is also in fluid communication with a product reservoir 37 through fluid line 40. In the most preferred embodiments, the multi-port valve 36 is also in communication with a processor (preferably the common processor 26), that is also in operative communication with the peristaltic pump 17 and the valve 36, for directing the flow of materials to and from the multi-port valve 36, the two-way pump 17, and the reaction cell 13. FIG. 1 illustrates that the valve 36 is in signal communication with the processor 26 through the signal line 41, and that the processor 26 is in communication with the peristaltic pump 17 through the signal line 42.

FIG. 1 also illustrates a plurality of fluid lines, some of which have already been designated with reference numerals, for providing the fluid communication described herein within the instrument. Thus, in conjunction with the fluid lines, the instrument further comprises a solvent supply 43 that connects to the valve 36 through the fluid line 44 for providing solvent to the reaction cell, or for rinsing and cleaning the various fluid lines, or both. A vent 45 is also in fluid communication with the multi-port valve 36 through fluid lines 46, gate (or equivalent) valve 47, and fluid lines 50 and 51. A waste reservoir 52 is also in fluid communication with the multi-port valve 36 through the fluid line 53 for receiving waste product, for example after rinsing ("backwashing").

In preferred embodiments, some of the fluid transfer, particularly for rinsing and backwashing, is carried out using an inert (i.e. chemically inert to the instruments and the reactions and the materials in the reactions) from a gas supply 54, which also communicates with the valve 36 through the fluid line 51. Depending upon the positions of the multi-port valve 36, the ball valve 34, the gate valve 47, a second gate valve 55, pressurized gas from the supply 54 can be used to push solvent through the respective lines in one or opposite directions as desired or necessary. Depending upon the orientation of the various valves, gas from the supply 54 can also be added to the vessel 13, either as a reactant or as an inert gas to help pump materials from the vessel 13.

The instrument also optionally includes a fluid level detector 38 that adds additional automated features to the instrument. In particular, one or two fluid level detectors 38 can be included, with only one illustrated in FIG. 1. When a single detector is used, it will detect the start ("head") of fluid flow from one of the reservoirs of 15, 16 toward the vessel 13. It can also detect the end of the flow (tail) and thus confirm that an appropriate amount of liquid has been added to the vessel. Because the processor 26 is programmed to know or select the amount of liquid being added to the vessel 13, the time period that extends between the head of the liquid flowing past the detector 38 and the tail of the liquid flowing past the detector 38 should correspond to the amount of liquid being sent to the vessel 13. If this differs from the amount calculated or desired by the processor, the instrument can be shut down until an operator can make the appropriate corrections or adjustments.

When two detectors are used, the detection of the head or tail of the fluid flow from one of the detectors to the next can also be used to calculate a flow rate which can be useful or necessary in a number of circumstances.

The lines and fixtures required to move solvent and gas in this manner are well understood in this art, and the flow paths indicated in FIG. 1 for this purpose are exemplary rather than limiting, and will not be described in further detail herein.

Figure 2:
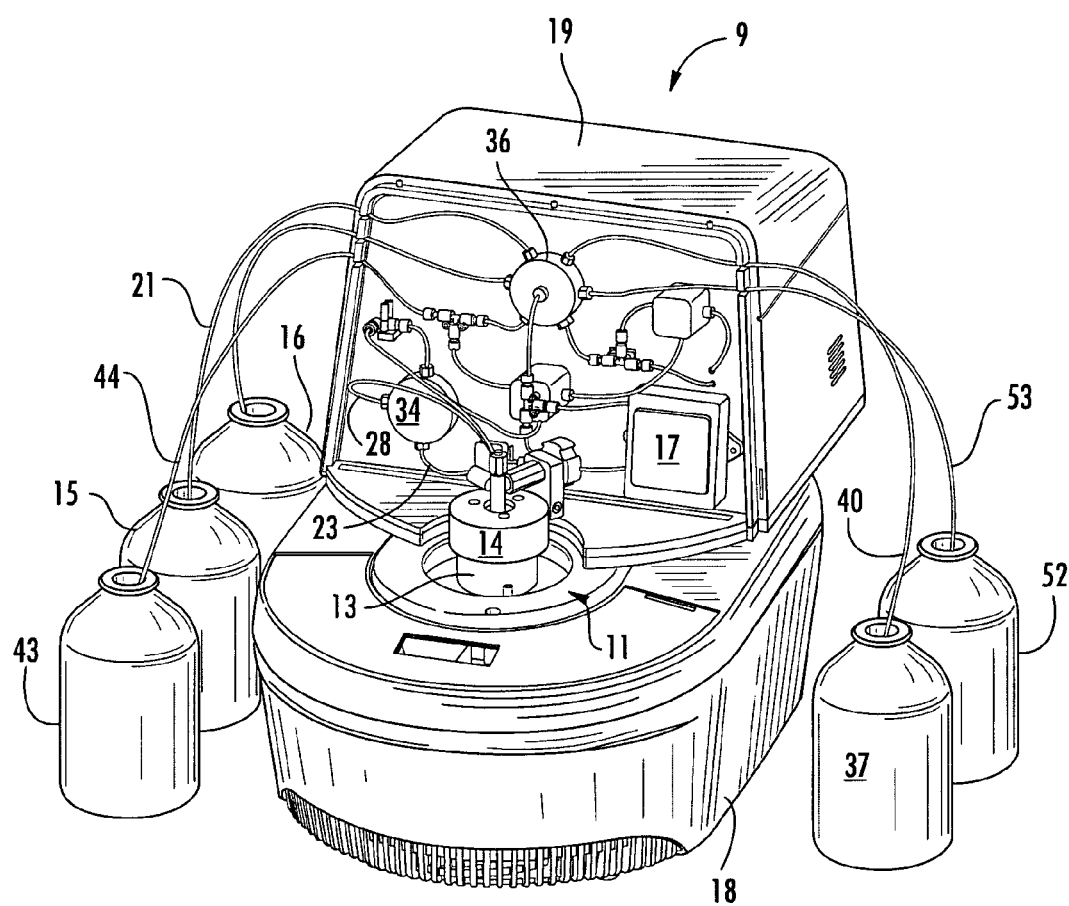
FIG. 2 is a perspective view of an instrument according to the claimed invention.

FIG. 2 is a perspective view of a commercial embodiment of the instrument shown schematically in FIG. 1. In FIG. 2 the instrument is broadly designated at 9, and includes a lower housing 18 and an upper housing 19. The cavity 11 is within the lower housing 18 and its location is broadly designated at 11. As described earlier, in preferred embodiments the portion of the instrument 9 that is included in the lower housing 18 is substantially identical to CEM's DIS-COVER™ instrument which is described on CEM's web site (www.cem.com) and set forth in several of the previously-incorporated patents and applications.

Portions of the vessel 13 are positioned in the cavity 11 and the vessel 13 includes a pressure lid or cap 14 with various liquid and gas fittings attached to it, which for the sake of clarity are not separately numbered in FIG. 2.

FIG. 2 similarly illustrates a series of containers that correspond to those shown schematically in FIG. 1. These include the solvent reservoir supply 43, the starting material reservoirs 15 and 16, the product reservoir 37 and the waste reservoir 52. These all are respectively connected to the multi-port valve 36 using the various fluid lines as described in FIG. 1 and carrying the same reference numerals.

In FIG. 2 the peristaltic pump 17 is positioned within the upper housing 19. Similarly, the multi-port valve 36 and the ball valve 34 are illustrated in FIG. 2 and carry the same reference numerals as FIG. 1. In the illustrated embodiment, the upper housing 19 carries several various motors and (if necessary) associated gear or drive movements that drive the peristaltic pump 17, the ball valve and 34 and the multi-port valve 36.

Figure 3:
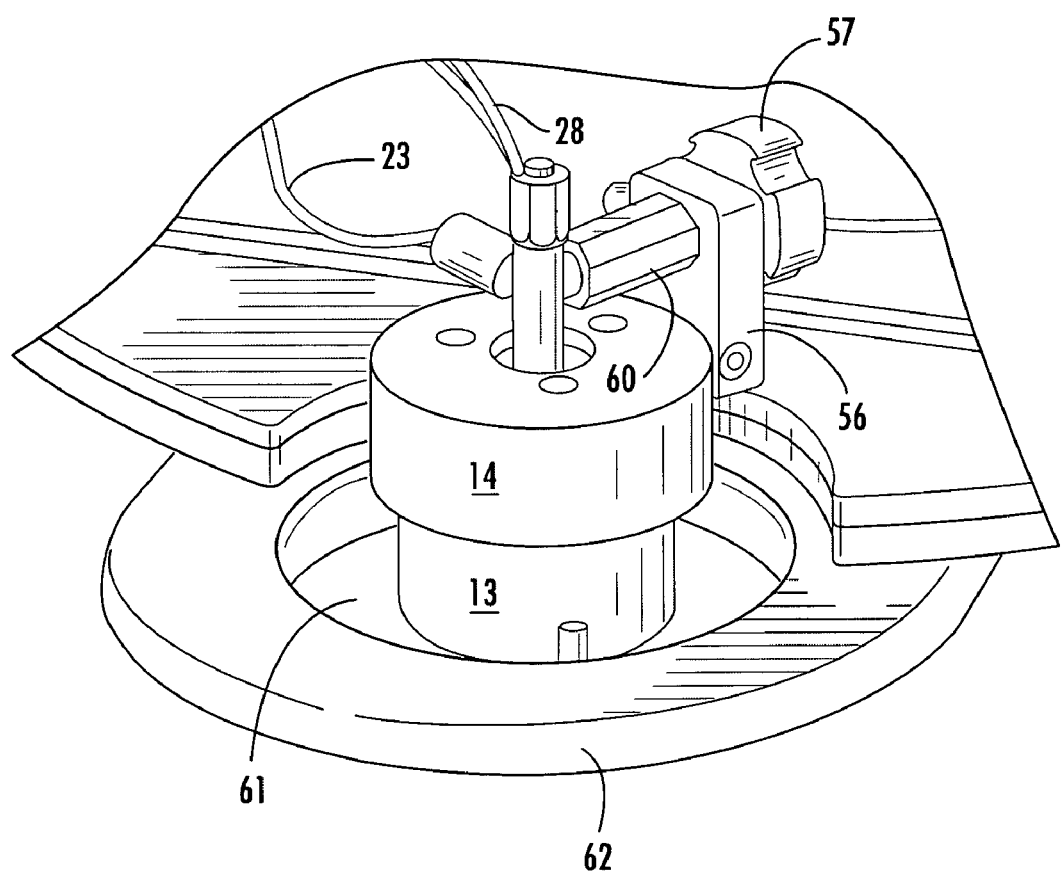
FIG. 3 is another perspective view of an enlarged portion of FIG. 2.

FIG. 3 is an enlarged view of a portion of FIG. 2 that shows the top of the vessel 13 in more detail. In addition to showing the vessel 13 and the pressure cap 14, FIG. 3 also illustrates a lock 56 and associated safety knob 57 that work in conjunction with a check valve 60 to prevent unintended release of high pressure gases from the vessel 13. In particular, the lock 56 prevents the cap 14 from being removed from the vessel 13 until the safety knob 57 has been opened to allow pressure to escape through the check valve 60. In this manner, the lock 56 and the knob 57 prevent the lid 14 from being removed from the vessel 13 when high pressures remain within the vessel 13.

FIG. 3 also shows the attenuator 61 on below the adapter plate 62. A number of the fluid and gas lines particularly 23 and 28 are also illustrated in the view of FIG. 3.

Although the operation of the instrument has been described in terms of the movement of individual samples, it will be understood that because the processor 26 is included and controls the valves, pump and related fluid flow, the instrument can be used in an automated fashion to carry out two or more identical or different reactions in sequence. The number of reactions that can be carried at in sequence is not limited by the processor or the vessel, but primarily by the number and type of reservoirs, fluid lines and valves that are included in any particular version of the device. Thus, it will be understood that the processor 26 can be programmed to carry out several reactions in sequence by selectively pumping specific starting materials from particular reservoirs at particular times to the reaction vessel and then exposing those materials to microwave radiation.

Following any one particular reaction, the vessel 13, the various fluid lines, and the valves 34 and 36 can be rinsed if necessary or desired with solvent from the solvent reservoir 43. Rinsing is optional, of course, and may not need to be carried out between all reactions, but the instrument provides the opportunity to carry out rinsing in manual or automated fashion as may be desired.

In another aspect, the invention is a method of conducting microwave assisted chemical reactions using high viscosity liquids or heterogeneous mixtures of liquids and solids. It will be understood that although the invention (as both instrument and method) is best described in terms of its capabilities of handling highly viscous liquids and heterogeneous mixtures, the invention is not limited to such materials, and homogeneous, free-flowing liquids (including compounds and solutions) can be used as well.

In this aspect, the method comprises pumping a discrete portion of a composition selected from the group consisting of high viscosity liquids and heterogeneous mixtures of liquids and solids to a microwave transparent pressure resistant reaction vessel at ambient pressures of between about atmospheric pressure and about 30 psi. The discrete portion is then isolated in the pressure resistant vessel, following which microwave radiation is applied to the isolated discrete portion in the reaction vessel to initiate and maintain a chemical reaction at a pressure of at least about 175 psi while preventing the vessel from releasing higher-pressure gases generated by a chemical reaction in the vessel. Pressure is next released from the vessel following desired completion of the chemical reaction and the reaction products of the discrete portion are pumped from the vessel at ambient pressures of between about atmospheric pressure and about 30 psi following the pressure release.

In preferred embodiments, and incorporating additional aspects of the processor 26 illustrated in FIG. 1, the method comprises pumping a second discrete portion after the first portion has been pumped out on the reaction vessel and thereafter carrying out the steps of isolating the second portion, applying microwave radiation to the second portion, releasing pressure from the vessel, and pumping reaction products from the vessel.

As a particular advantage over those continuous flow instruments that incorporate a length of tubing in the microwave field, the method can further comprise stirring the discrete portion in the reaction vessel during the step of applying microwave radiation. For the sake of clarity FIG. 1 does not illustrate such a stirrer, but it will be understood that a very typical and exemplary technique is to include a Teflon-coated magnetic stirrer bar in the vessel and to rotate it using an external magnet beneath or adjacent the vessel.

As noted previously, the step of applying microwave radiation preferably comprises applying single or dual modes rather than multiple modes in the cavity. Those familiar with microwave modes will recognize that the establishment of a specific single or duel mode in a particular cavity is a function of the wavelength (frequency) of the microwaves and the dimensions, potentially including the shape, of the cavity into which the microwaves are propagated. Differently shaped cavities can be incorporated with different wavelengths to produce a single or dual-mode of radiation. In the present invention, the single mode cavities that are described and set forth in the commonly assigned and previously-incorporated patents and applications are exemplary.

As set forth with respect to the structural aspects of the invention, the method can also comprise, and often typically comprises, maintaining their reaction vessel at a constant temperature for an extended portions of a chemical reaction, recognizing of course that the reaction will need to heat up to such temperature on as an initial part of the reaction scheme. The method also comprises measuring the temperature of the reaction vessel or of its contents, and then adjusting the application of microwave radiation in response to the measured temperature. The method also preferably comprises the step of measuring the temperature of the reaction vessel or its contents and cooling the reaction vessel in response to the measure temperature so that the combination of adjusting the applied or propagated microwave radiation and the application of cooling keeps the reaction subject to a desired amount of microwave radiation but at a desired fixed temperature.

In preferred embodiments, the method comprises maintaining the pressure in the reaction vessel at between about 175 and 250 psi as this range tends to be the temperature and pressure range at which a number of chemical reactions proceed most favorably.

As described with respect to the structural elements of the invention, the method can also comprise rinsing or backwashing the reaction vessel with a solvent between the steps of pumping the first reaction products and pumping the second discrete portion. In preferred embodiments, the method comprises driving the rinsing solvent with an inert gas. As used herein the term "inert" does not necessarily (although it can) refer to the noble gases, but includes any appropriate gas that does not disadvantageously react with the instrument, the reactants, or the products. In many (but not necessarily all) applications nitrogen is an appropriate inert gas for these purposes.

Because the number of components (reactants, products, catalysts, solid supports) is limited only by the selection valves and piping, the method preferably comprises mixing the composition to be pumped and exposed to microwaves from components selected from the group consisting of solids, liquids, solutions, solid phase catalysts and solid-supported reagents prior to the step of pumping the composition to the reaction vessel.

Figure 4:
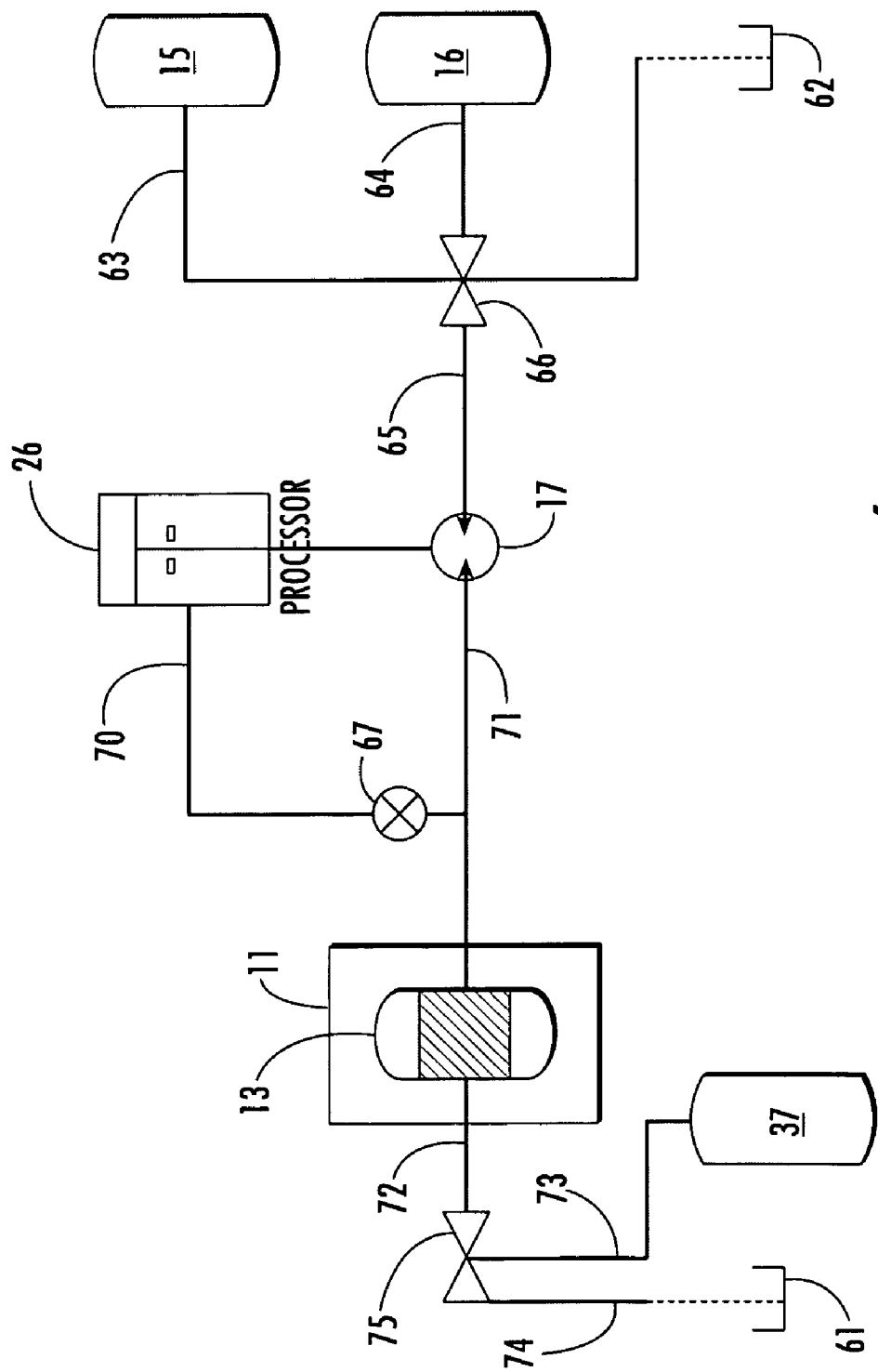
FIG. 4 is another schematic diagram of the instrument according to the claimed invention.

The additional features of the invention are best understood with respect to FIGS. 4 through 8. As a starting point, FIG. 4 is a schematic view that includes several elements in common with FIG. 1 and these will retain common numerals wherever possible for the sake of clarity. Certain of these common elements include the processor 26, a reaction vessel 13, the cavity 11, and the pump 17. Other features include one or more source or solvent reservoirs 15 and 16, along with a product reservoir 37 and potentially a waste 61 on the product side of the apparatus and an analogous waste 62 on the supply side of the apparatus.

It will also be understood that the elements illustrated in FIG. 4 are consistent with those illustrated in FIG. 1, but that FIG. 1 includes more elements because it is intended to illustrate the numerous features referred to earlier. Alternatively, FIG. 4 is not meant to be a limiting diagram, but only includes certain of the elements for purposes of illustrating specific features of the instrument. Stated differently, the elements referred to in FIG. 4 can all be used in conjunction with those illustrated in FIG. 1 and vice versa.

As FIG. 4 illustrates, the fluid reservoirs 15 and 16 are in communication with the pump 17 through respective fluid lines 63, 64, and 65 with an appropriate valve 66 located in the fluid lines for the purpose of directing fluids from one or both of the supply reservoirs 15, 16 or to the waste 62. Some of these lines, although carrying different reference numerals, can be the same lines that are illustrated for the same purposes in FIG. 1, or their functional equivalents.

The pump 17 is preferably a two way pump in fluid communication with the reservoirs 15, 16 for pumping fluids to and from the reservoirs. The reaction vessel 13 is formed of an appropriate microwave transparent material and is in fluid communication with the pump 17 for supplying or receiving fluids to or from the pump 17 and a the reservoirs 15, 16.

FIG. 4 illustrates a pressure sensor 67 that is in fluid communication with the supply reservoirs 15, 16 and the vessel 13 for measuring the pressure of fluids in the instrument at the sensor 67. The processor 26 is in signal communication with the pressure sensor 67 through the signal line 70 for controlling the pump 17 and the flow of fluids in the instrument based at least in part on the pressure measured at the sensor 67. Again, it will be understood that the pressure sensor 67 need not be the only input to the processor and that, if desired the pressure sensor 67 can work in conjunction with the other control elements described with respect to FIGS. 1 through 3.

The pump is in communication with the vessel 13 and the vessel 13 is also in fluid communication with the reservoir 37 and the waste 61 through respective fluid lines 71, 72, 73 and 74 and potentially including the additional valve 75.

It will be understood that from a conceptual standpoint the number of valves, tubes, reservoirs, and product containers are theoretically unlimited, with the only practical limitations being size and space. Thus, those of ordinary skill in the art will be able to practice the invention in any number of different variations without undue experimentation.

Figure 5:
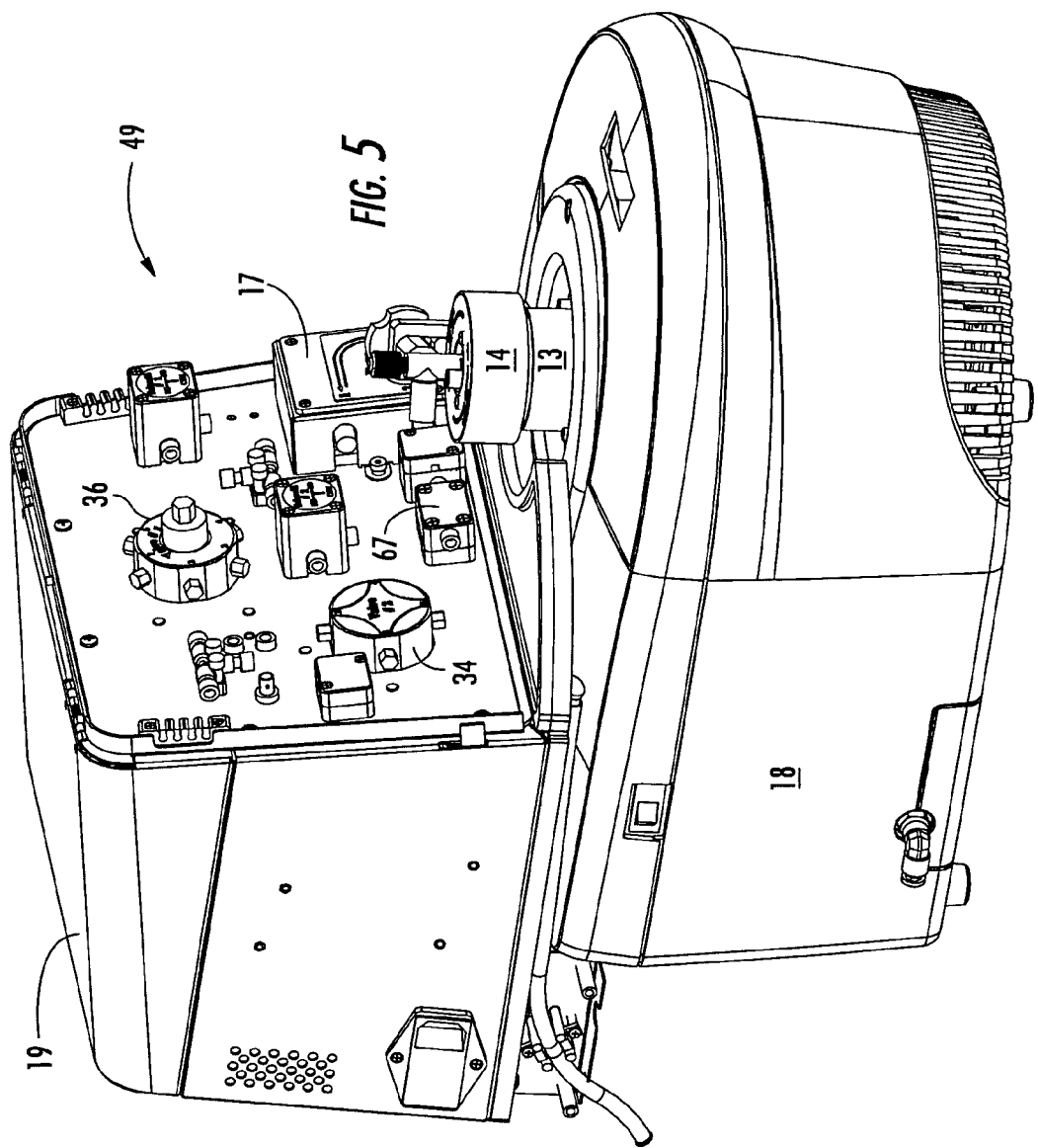
FIG. 5 is a perspective view of another embodiment of the invention.

FIG. 5 is a perspective view of an embodiment of the invention that includes the additional features described herein. In FIG. 5, as well as in FIGS. 6 through 8, common elements carry common reference numerals whenever possible in order to clarify the description. Thus, as in FIG. 2, the instrument is broadly designated at 49 to distinguish it from the version illustrated in FIG. 2. The instrument 49 includes the upper housing 19 and the lower housing 18 for the instrument, along with the pressure vessel 13 and its pressure cap 14. The cavity (11) is not illustrated in the perspective view of FIG. 5. Similarly, FIG. 5 refrains from illustrating the tubing in order to clarify the remaining elements of the instrument. FIG. 5 also includes the pump 17, the multi-port valve 36 and the ball valve 34 as described previously.

In particular, FIG. 5 also illustrates the pressure sensor as the rectangular housing 67 on the lower front face of the upper housing 19 positioned to the left of the pump 17.

Figure 6:
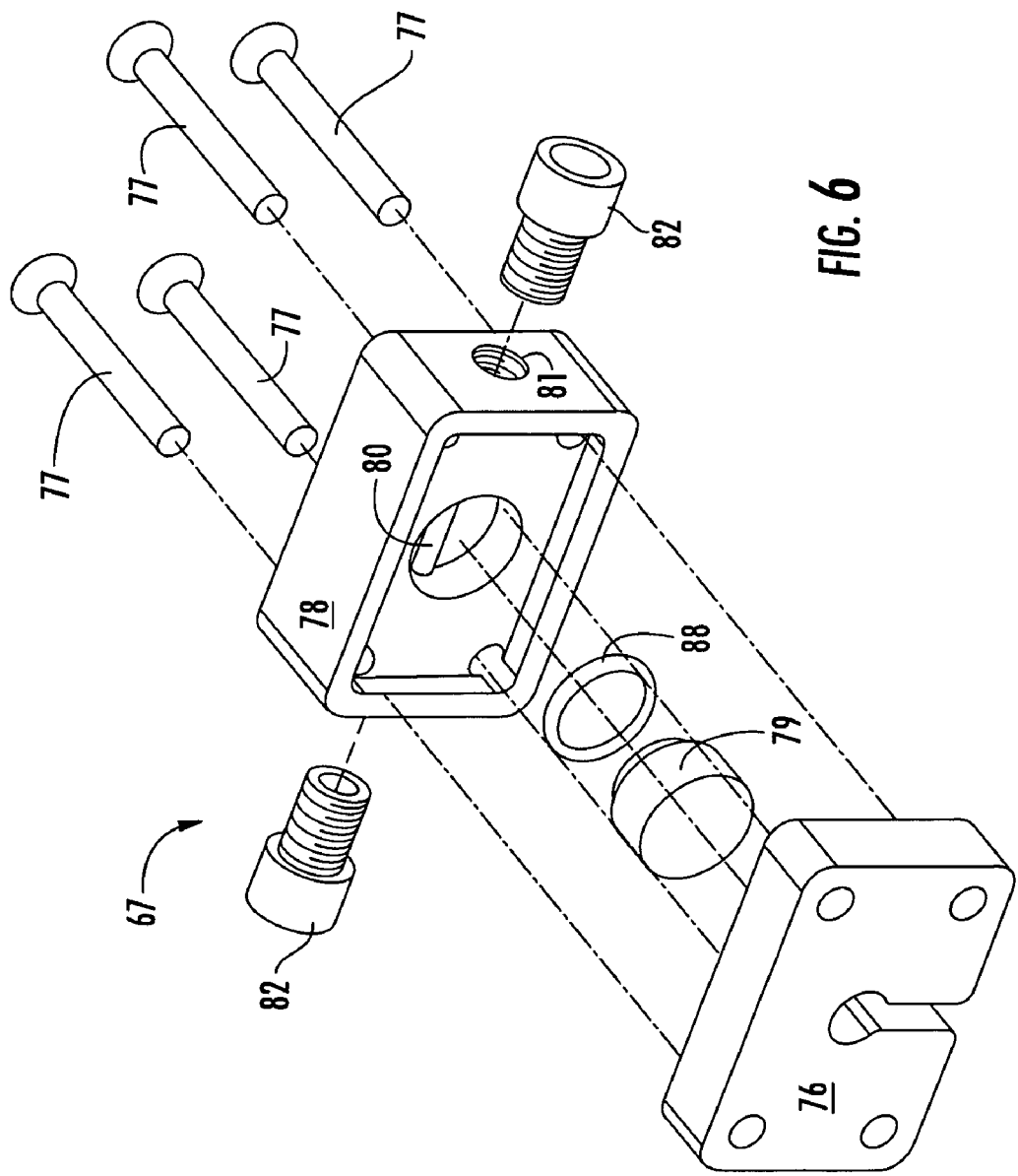
FIG. 6 is an exploded view of the clog detector according to the present invention.

FIG. 6 is an exploded view illustrating a preferred embodiment of the pressure sensor 67 in somewhat more detail. FIG. 6 illustrates that the pressure sensor 67 includes a two-part housing 76 and 78 which in the illustrated embodiment are held together by appropriate bolts, screws or rivets 77. Fluid flows through the housing 67 through the internal channel 80. In turn, the channel 80 is in communication with the remainder of the fluid flow path of the instrument through two respective openings, one of which is shown at 81 in FIG. 6. In preferred embodiments, the flexible tubing, which typically has a 0.6 inch outside diameter, is maintained in the opening 81 and using the fittings 82. Within the housing 76,78 a pressure transducer 79 bears against the channel 80 while being seated with the o-ring 88.

The benefit of the sensor 67 can be understood in an exemplary sense as follows. Generally, the fluid movement is referred to as "forward" when it flows in a direction from the pump 17 towards the vessel 13. The flow is designated as "reverse" when it is in the direction of the vessel 13 to the pump 17. In this orientation, if the fluid lines become clogged on the vessel side of the pump during forward flow, the resulting pressure at the sensor 67 will be quite high. Alternatively, if the clog is on the supply side of the pump 17 during forward flow, the pressure at the sensor 67 will be quite low. Alternatively, when the flow is in the reverse direction and a clog occurs on the vessel side of the pump, the pressure will be quite low. In a corresponding manner, when the flow is in the reverse direction in a clog occurs on the supply side of the pump, the resulting pressure will be high.

The pressures that qualify as "high" or "low" are based upon the normal pressures expected, predicted, or previously determined for the materials being pumped. The processor can be easily programmed to recognize both "low" and "high" set point pressures and to respond as desired.

These "high" and "low" pressure relationships are, of course, based upon the relative positions of the pressure sensor 67 with respect to the pump 17 and the vessel 13 and need not directly mimic FIG. 4. Stated more generally, a clog forward of the pressure sensor in the direction of flow will result in an increased pressure at the sensor. Similarly, a clog rearward of the pressure sensor (again with respect to the direction of flow) will result in a decreased pressure at the sensor.

Because the processor can be programmed to monitor the intended direction of flow and indeed controls the pump 17 for this purpose the processor can also be programmed to respond to high or low pressure as measured at the sensor 67 thus detect the presence of the clog and its relative location. The processor can then controlled the pumps the and the valves as necessary to typically reverse the flow, potentially also adding solvent or reactant or other desired materials from the reservoirs to help clear the clog and return the instrument to its normal flow-through operation. Combined with the normal two-way flow capabilities of the instrument, the combination of intended flow direction and measured pressure will (1) identify the instrument's status as normal or clogged, (2) recognize the relative position of the clog, and (3) reverse the pump (and thus the flow direction) in an effort (typically successful) to clear the clog.

Because the processor can be programmed to carry out these decisions and the resulting curative steps, the processor and the pressure sensor increase the "walk-away" advantages of the device. Stated differently, an operator can leave the device and allow it to run on its own with a higher degree of confidence that the instrument will address and cure the majority of clogging situations without attention from the operator. In such manner, the instrument increases both its own productivity as well as that of laboratory personnel.

Figure 7:
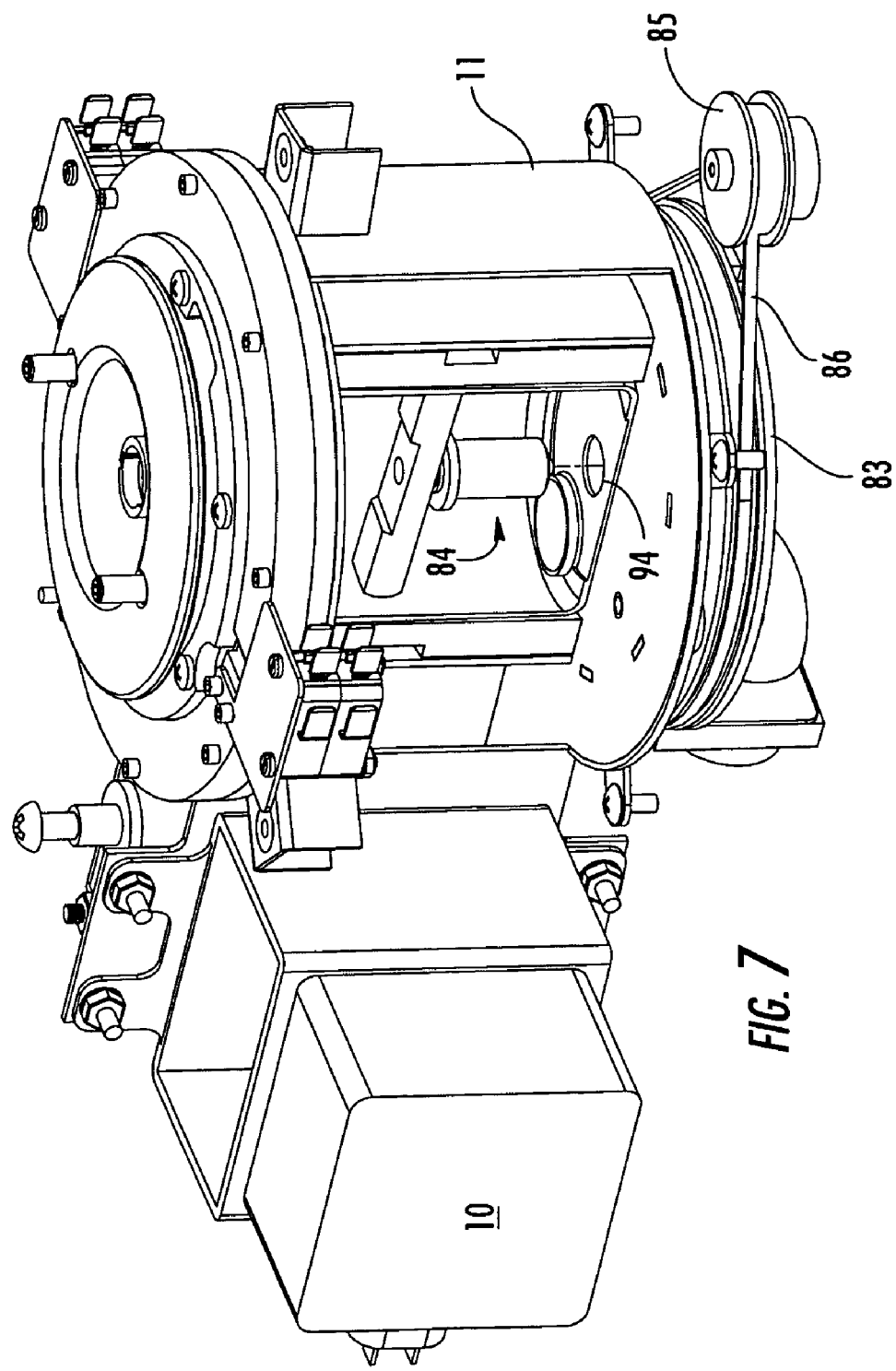
FIG. 7 is a partially cut-away and perspective view of the stirring system of the invention.

FIG. 7 is a perspective view with a cut away portion of the stirring aspect of the instrument of the present invention. As illustrated therein, the instrument includes the microwave cavity 11, with a normally-present vessel and its stirrer bar being omitted for the sake of clarity.

FIG. 7 does, however, illustrate a first rotating magnet 83 positioned externally to and adjacent the cavity 11. Positioning the rotating magnet 83 outside of the cavity helps minimize or eliminate any interaction between the magnetic field of the magnet 83 and microwave propagation in the cavity 11. A second rotating magnet broadly designated at 84 is inside the cavity for being driven by the first rotating magnet (as these magnets couple with one another) and for driving the rotation of the stirrer bar in the reaction vessel. In preferred embodiments and as illustrated in FIG. 7, the external rotating magnet 83 is driven by a motor (not shown) that in turn drives the pulley illustrated at 85 and thus the belt illustrated at 86. There are, of course, a number of straightforward structures and techniques for rotating an object such as the external magnet 83 which are fully equivalent to those illustrated in FIG. 7.

In preferred embodiments, the second rotating magnet 84 is positioned in lower portions of the cavity 11 in order to minimize any interference between the magnetic field of the second magnet and the microwaves in the cavity.

Figure 8:
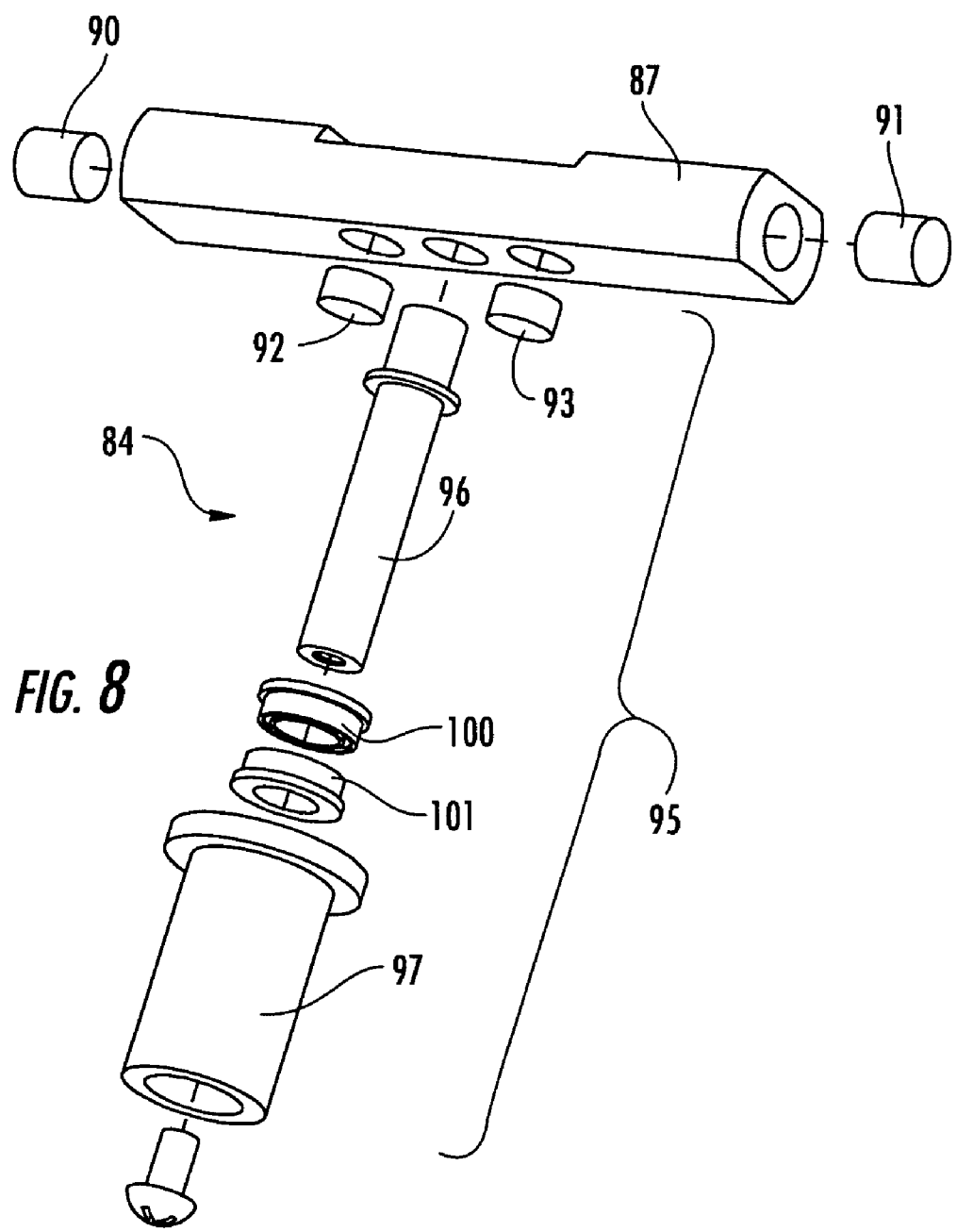
FIG. 8 is an exploded view of a portion of the stirring system of the invention.

FIG. 8 shows the second rotating magnet 84 in somewhat greater detail. In particular, the second rotating magnet 84 is formed of a bar 87 formed of a material that is transparent to both microwave radiation and to magnetic fields with the respective ends of the bar 87 defining the circumference of rotation of the bar 87 in the cavity 11. An outer pair 90 and 91 of relatively small (this is understood to be a relative term) magnets are carried in the bar 87 and are positioned respectively adjacent each end of the bar 87 for coupling with and being driven by the first rotating magnet 83. Another pair 92 and 93 of small magnets are positioned in the bar 87 and near its center for coupling with and driving this stirrer bar. As noted above, the strength of a magnetic field of the magnet decreases proportionally to the square of the distance from the magnet. The design illustrated in FIG. 8 complements both the larger size of the external magnet 83 by providing the magnet pair 90, 91 for coupling most efficiently with the external magnet 83 while the inner pair 92, 93 couples most efficiently with the stirrer bar in the vessel.

As illustrated in FIG. 7, in preferred embodiments of the instrument the cavity 11 includes an axle sleeve 94 and the second magnet 84 includes an axle 95 so that the second magnet 84 will rotate in the magnet sleeve 94 in the cavity when the second magnet 84 is driven by the rotation of the first magnet 83. FIG. 8 also illustrates that the axle 95 can include several portions illustrated as an inner stem 96, an outer stem 97, and bearings 100 and 101, all of which are preferably formed of a polymer that has a relatively low coefficient of friction with respect to the (typically metal) portions of the cavity 11 with which they come in contact.

In the drawings and specification there has been set forth a preferred embodiment of the invention, and although specific terms have been employed, they are used in a generic and descriptive sense only and not for purposes of limitation, the scope of the invention being defined in the claims.

What is claimed is:

1. A method of conducting flow through microwave assisted chemistry comprising:
    directing a flow of fluid between a reservoir and a reaction vessel;
    exposing a portion of the flowing fluid to microwave radiation to thereby initiate or accelerate chemical reactions in the fluid;
    measuring the pressure of the flowing fluid between the reservoir and the reaction vessel; and
    conditionally reversing the flow of fluid based upon the measured fluid pressure.

2. A method according to claim 1 comprising directing the flow of fluid from the reservoir to the reaction vessel and reversing the flow of fluid when the pressure increases beyond an upper set point pressure.

3. A method according to claim 1 comprising directing the flow of fluid from the reservoir to the reaction vessel and reversing the flow of fluid when the pressure decreases below a desired set point pressure.

4. A method according to claim 1 comprising directing the flow of fluid from the reaction vessel to the reservoir and reversing the flow of fluid when the pressure increases beyond an upper set point pressure.

5. A method according to claim 1 comprising directing the flow of fluid from the reaction vessel to the reservoir and reversing the flow of fluid when the pressure decreases below a desired set point pressure.

6. A method according to claim 1 wherein the step of conditionally reversing the flow of fluid comprises signaling a processor based upon the measured pressure and reversing a pump based upon a signal from the processor.

7. A method according to claim 1 wherein the step of conditionally reversing the flow of fluid comprises adding additional fluid as the flow is reversed.

* * * * *